(12) United States Patent
Dong

(10) Patent No.: US 7,210,618 B2
(45) Date of Patent: May 1, 2007

(54) MOBILE COMMUNICATION TERMINAL

(75) Inventor: Zhu Dong, Vaerlose (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/071,503

(22) Filed: Mar. 3, 2005

(65) Prior Publication Data
US 2006/0196925 A1    Sep. 7, 2006

(51) Int. Cl.
*G06F 17/00* (2006.01)
(52) U.S. Cl. ............... 235/375; 345/156; 345/566
(58) Field of Classification Search ............ 235/375; 345/168, 169, 156, 173; 340/407.1; 368/10; 455/566, 90.3, 556.2, 556.1, 557; 200/1 R
See application file for complete search history.

(56) References Cited

U.S. PATENT DOCUMENTS 5,987,336 A * 11/1999 Sudo et al. ............... 455/566
6,201,524 B1 * 3/2001 Aizawa ..................... 345/684
6,340,800 B1 * 1/2002 Zhai et al. .................. 200/5 R
6,535,461 B1 * 3/2003 Karhu .......................... 368/10
7,023,421 B2 * 4/2006 Wong et al. ............... 345/156
2003/0036362 A1 * 2/2003 Buesseler et al. ............ 455/90
2004/0127267 A1   7/2004 Wong et al.

FOREIGN PATENT DOCUMENTS

EP        0 679 003        6/1999

* cited by examiner

*Primary Examiner*—Michael G. Lee
*Assistant Examiner*—Kristy A. Haupt
(74) *Attorney, Agent, or Firm*—Perman & Green, LLP

(57) ABSTRACT

A mobile communication terminal comprising a display and a keypad having plural keys. The keypad comprises a frame surrounding the display and the keys are arranged at respective key positions on the frame. The terminal is further configured to display symbols at positions on the display corresponding to the key positions on the frame. Furthermore, said frame is arranged to be rotated between at least a first and a second position whereby each said key becomes associated with a respective first and second operation of the terminal.

14 Claims, 5 Drawing Sheets

MOBILE COMMUNICATION TERMINAL

FIELD OF THE INVENTION

This invention relates to a communication terminal having an improved keypad and a communication terminal cover comprising a keypad.

BACKGROUND

Mobile communication terminals such as cellular phones that particularly require portability are widely used today. Most of these terminals comprise a user interface input device such as a keyboard of which many varieties exist. Until now, focus has mainly been on features and performance of these handheld units. Since users become more accustomed to operating these devices they demand more versatile and advanced, but at the same time user-friendly and efficient input interfaces.

One way in which this has been addressed is described in U.S. Pat. No. 6,535,461, which discloses a communication device comprising a one-piece rotatable ring arranged in conjunction with push buttons. By rotating the ring and applying pressure on the ring the buttons are pushed and a user is able to choose and select operations for controlling the device.

However, although the user can select operations with this configuration, the number of operations available by controlling the one-piece rotatable ring is limited due to the construction. In fact, the arrangement described in U.S. Pat. No. 6,535,461 is configured to overcome problems related to small scale input means by reducing the number of keys while maintaining data entry capability.

SUMMARY OF INVENTION

An object of the present invention is hence to solve a problem of how to provide a communication terminal with an improved input interface.

The object is achieved with a mobile communications terminal comprising a display and a keypad having plural keys. The keypad comprises a frame surrounding the display and the keys are arranged at respective key positions on the frame. The terminal is further configured to display symbols at positions on the display corresponding to the key positions on the frame. Furthermore, the frame is arranged to be rotated between at least a first and a second position whereby each key becomes associated with a respective first and second operation of the terminal.

In a preferred embodiment the communication terminal is configured such that the symbols on the display changes upon rotation of the frame between first and second positions.

In other preferred embodiments the frame of the communication terminal is round, circular or of any polygonal shape.

According to another preferred embodiment, the rotational motion of the frame is limited by mechanical spring means, whereby the second position corresponds to an intermediate position to which the frame is rotated and from which the frame returns to the first position by the mechanical spring means.

Furthermore, according to preferred embodiments of the invention the symbols may comprise alphanumerical representation, graphical symbols or the like for presentation of digits, menu alternatives or any other operations of the communication terminal.

The invention also relates to a communication terminal cover comprising a keypad according to the invention as discussed above.

Hence, in summary, the invention can be described as a special configuration of a keypad, where keys are mounted on a frame base that can be turned clockwise or anticlockwise. The functions of the keys are shown by symbols or text located next to the keys on a display screen that is surrounded by the frame. When the frame is turned to a new position, these key functions are changed to new functions. With such a configuration, it is possible to create a keypad where the functions of the keys are changeable. This has the advantaget in that it provides a configuration with more functions using the same keypad, while at the same time being intuitive for the user.

Moreover, it is advantageous that it is possible to quickly change the function of the keys on the keypad. That is, in contrast to prior art arrangements, a user may quickly and without having to move his/her fingers any great distance change the operating mode of the terminal. This in contrast to, e.g., prior art solutions where menu selections typically are made using scrolling lists where a user was forced, in a repeating manner, to press one or more key in order to scroll the menu items.

BRIEF DESCRIPTION OF THE DRAWINGS

The invention will now be described in more detail with reference to the accompanying schematic drawings, which for the purpose of illustration show some non-limiting embodiments and in which.

PREFERRED EMBODIMENTS

Figure 1:
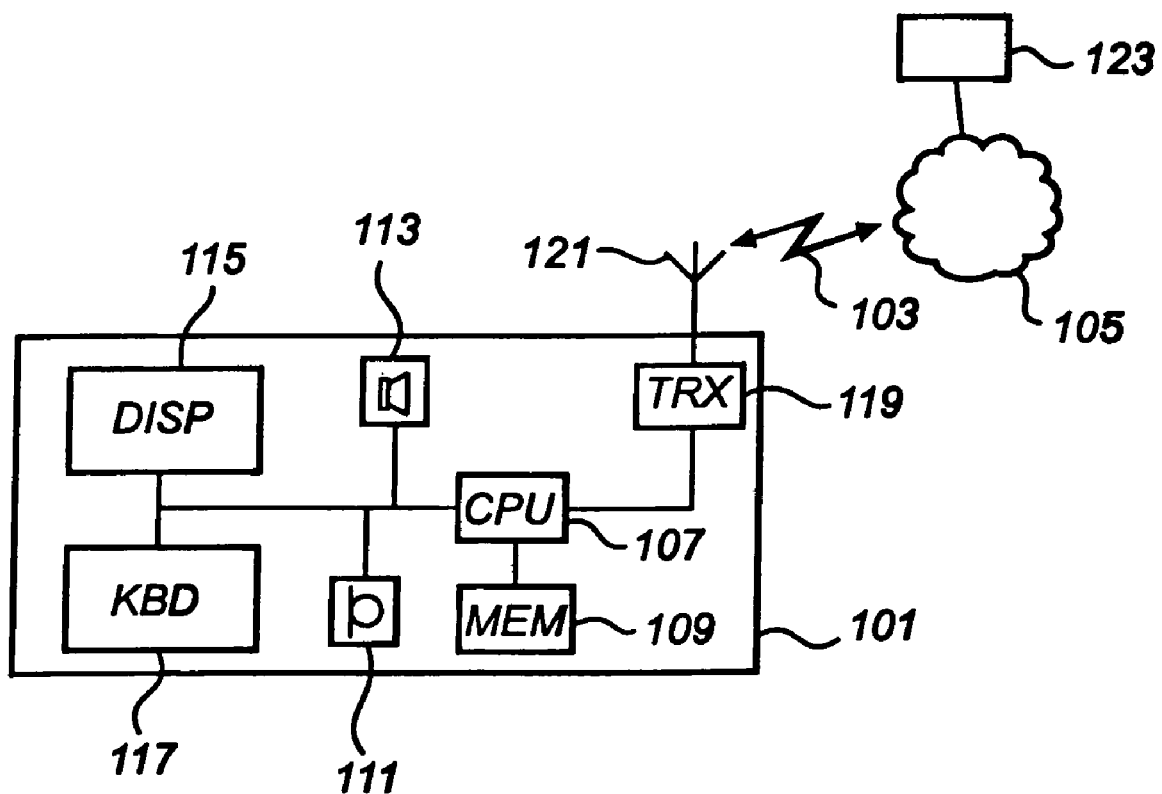
FIG. 1 shows schematically a block diagram of a mobile communication terminal according to the present invention.

FIG. 1 illustrates schematically a communication terminal 101 in which the present invention is implemented. The terminal 101 is capable of communication via an air interface 103 with a radio communication network 105 such as the well known systems CDMA2000, D-AMPS, GSM, UMTS, EDGE, etc. The terminal comprises a processor 107, memory 109 as well as input/output units in the form of a microphone 111, a speaker 113, a display 115 and a keyboard 117. Radio communication is realized by radio circuitry 119 and an antenna 121. Connected to the radio communication network 105 is a controller 123. The details regarding how these units communicate are known to the person skilled in the art and is therefore not discussed further.

Figure 2:
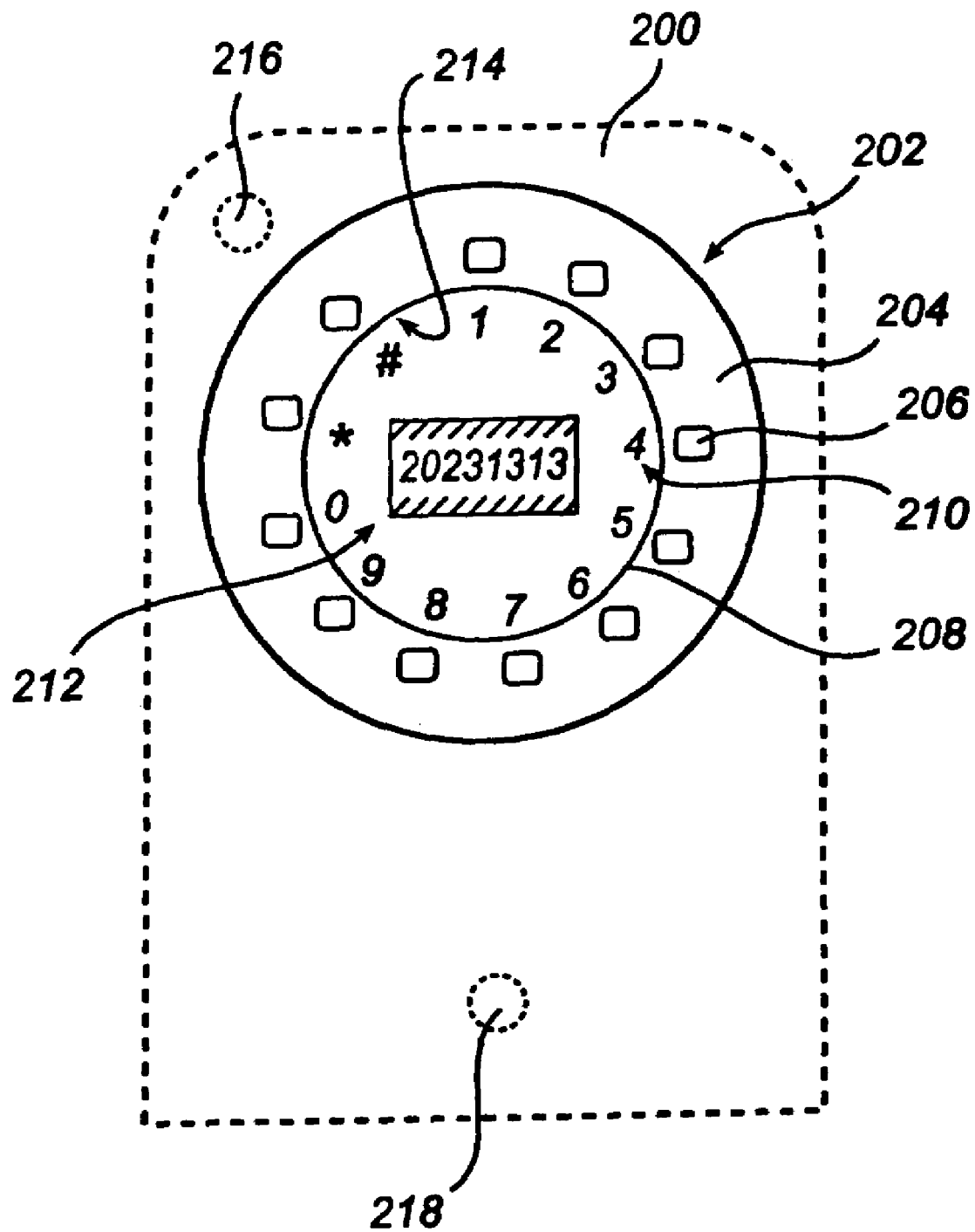
FIG. 2 shows schematically a communication terminal having a circular rotatable keypad according to the invention.

FIG. 2 illustrates schematically a communication terminal 200 having a display 208 and a keypad 202 with plural keys 206. A loudspeaker 216 and a microphone 218 are indicated.

The keypad comprises a circular rotatable frame 204 surrounding the display 208. The frame 204 is rotatable in a clockwise and an anti-clockwise direction. Mechanical and electrical means (not shown) are arranged in the terminal 200 to detect rotation of the frame 204 and to provide signals to control circuitry (not shown) in the terminal indicating the amount of rotation. The display 208 is configured to present symbols 210 at positions on the display corresponding to the positions of the keys on the frame 204. In the embodiment of FIG. 2, the symbols 210 are displayed at positions evenly distributed around a circle as defined by an inner edge 214 of the frame 204. A central area of the display 212 is used for display of any information, as the skilled person will realize.

Turning now to FIGS. 3 and 4, where preferred embodiments of a communication terminal are described having different configurations regarding number of keys and frame shape.

Figures 3A, 3B:
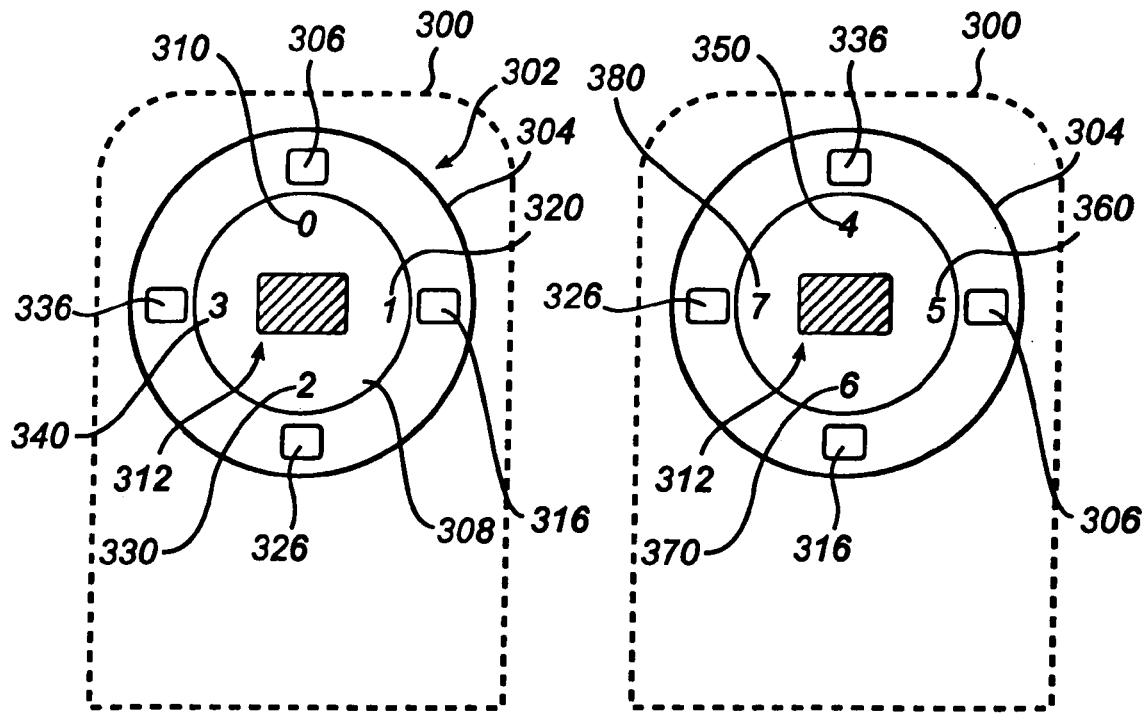
FIG. 3a shows a circular rotatable keypad in a first position according to the invention.
FIG. 3b shows a circular rotatable keypad in a second position according to the invention.

FIG. 3a illustrates schematically a part of a communication terminal 300 comprising a display 308 with a central area 312 and a keypad 302 with keys 306, 316, 326 and 336. The keypad 302 comprises a circular rotatable frame 304 surrounding the display 308. On the display symbols 310, 320, 330 and 340 are presented at positions corresponding to the keys 306, 316, 326 and 336 respectively.

FIG. 3b illustrates schematically a part of a communication terminal 300 where, due to rotation of the frame 304, the keys 306, 316, 326 and 336 have obtained new respective positions, namely, key 306 has taken the position of key 316, which in turn has taken the position of key 326 and so on. Furthermore, the symbols corresponding to the keys have also changed and keys 306, 316, 326 and 336 now have corresponding symbols 350, 360, 370 and 380 respectively. The change of symbols is controlled by circuitry (not shown) in the terminal as a response to signals received via mechanical and electrical means (not shown) as briefly described in connection with FIG. 2.

Figures 4A, 4B:
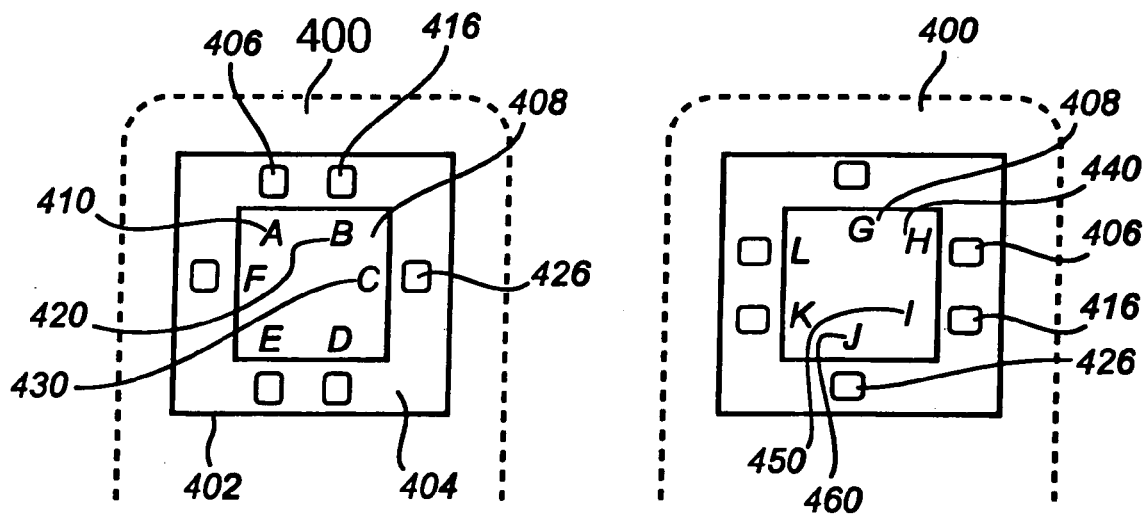
FIG. 4a shows a polygonal rotatable keypad in a first position according to the invention.
FIG. 4b shows a polygonal rotatable keypad in a second position according to the invention.

FIG. 4a illustrates schematically a part of a communication terminal 400 comprising a display 408 and a keypad 402 with keys 406, 416, and 426. The keypad 402 comprises a polygonal rotatable frame 404 surrounding the display 408. On the display symbols "A" 410, "B" 420 and "C" 430 are presented at positions corresponding to the keys 406, 416 and 426 respectively.

Similar to the situation described above in connection with FIG. 3b, FIG. 4b illustrates schematically a part of the communication terminal 400. Due to rotation of the frame, the keys 406, 416 and 426 have obtained new respective positions. Furthermore, the symbols corresponding to the keys have also changed and keys 406, 416 and 426 now have corresponding symbols "H" 440, "I" 450 and "J" 460 respectively.

Figure 5A:
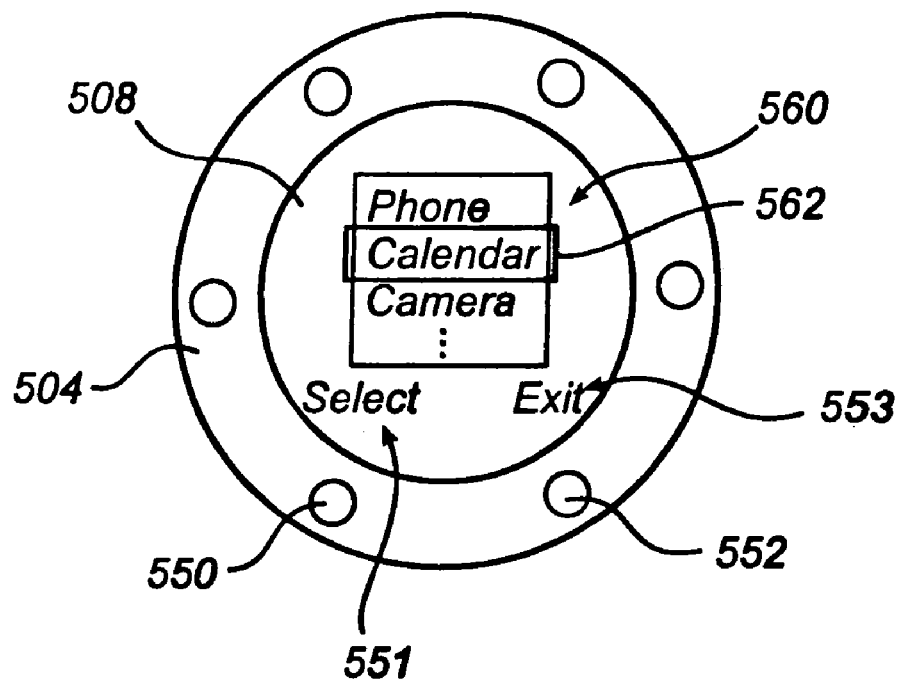
FIGS. 5a and 5b illustrate schematically usage of a keypad configured according to the invention.
Figure 5B:
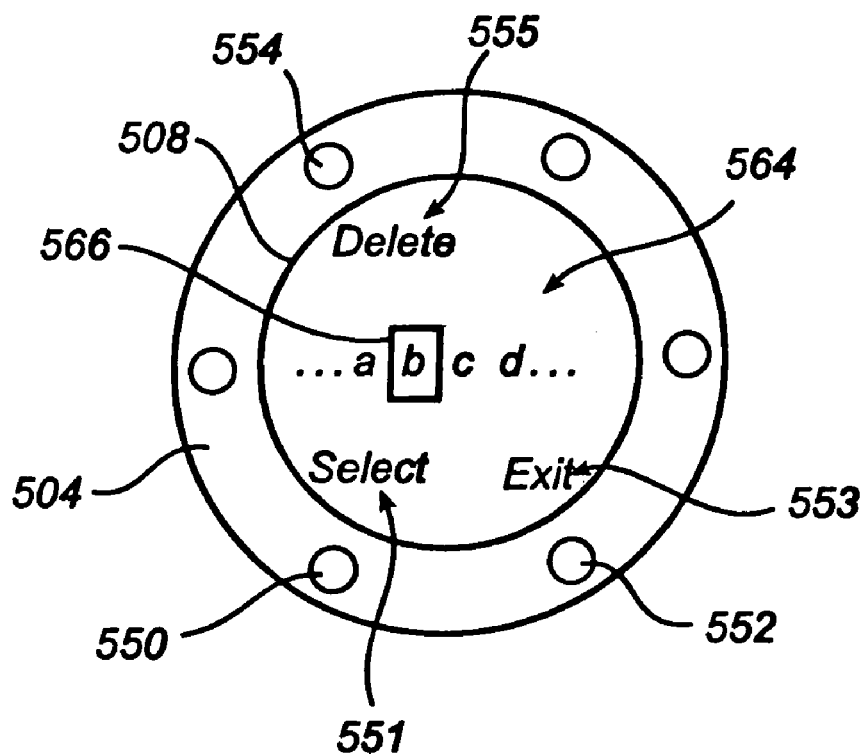

FIGS. 5a and 5b illustrate a usage scenario of a terminal comprising a keypad according to the invention. It is to be noted that FIGS. 5a and 5b are very schematically drawn and in which only a display 508 surrounded by a frame 504 having a number of keys are illustrated. Although only three keys are discussed in connection with FIGS. 5a and 5b, i.e. keys 550, 552 and 554, the frame comprises other keys that are used as described, e.g., above in connection with FIGS. 2 to 4.

FIG. 5a illustrates a point in time at which a user has rotated the frame 504 in order to scroll the contents of a menu 560. One menu item 562 is highlighted to indicate an action to take when the user presses key 550, which is associated with a selection action and also indicated by a "Select" label 551. FIG. 5a illustrates a case where the user is about to press the "Select"-associated key 550 and by that execute a calendar application in the terminal. A key 552 is also illustrated as being associated with an exit action and indicated by an "Exit" label 553.

In a calendar application such as the application described above, four keys may be associated with different functions depending on the position of the rotating frame as summarized in the following table:

|       | Frame position 1 | Frame position 2 | Frame position 3 |
|-------|------------------|------------------|------------------|
| Key 1 | Show date        | Delete item      | New appointment  |
| Key 2 | Goto date        | Open item        | New reminder     |
| Key 3 | Select item      | Send item        | New birthday     |
| Key 4 | Exit             | Exit             | Settings         |

The function "Select item" may, for example, enable the rotating frame to be used in a navigation operation or enable the keys for stepping up/stepping down.

Similarly, in a camera application, four keys may be associated with different functions depending on the position of the rotating frame as summarized in the following table:

|       | Frame position 1 | Frame position 2 | Frame position 3 |
|-------|------------------|------------------|------------------|
| Key 1 | Take picture     | Save             | Enlarge          |
| Key 2 | Exit             | Exit             | Reduce           |
| Key 3 | Zoom in          | Discard          | Rotate           |
| Key 4 | Zoom out         | Send             | Mirror           |

FIG. 5b illustrates a point in time when the user has selected and started the calendar application and is in the progress of entering a text string. The display 508 is now displaying a sequence of letters 564, which the user is able to scroll by rotating the frame 504 clockwise and anti-clockwise, as discussed above. When scrolling, one of the symbols, in this case the letter "b" is highlighted as indicated by a highlight frame 566. By pressing the "Select"-associated key 550, the user will enter the letter "b" into the calendar application. As indicated in FIG. 5b, a key 554 associated with a delete action, and also indicated by a "Delete" label 555, the user may delete an already entered symbol.

Figure 6:
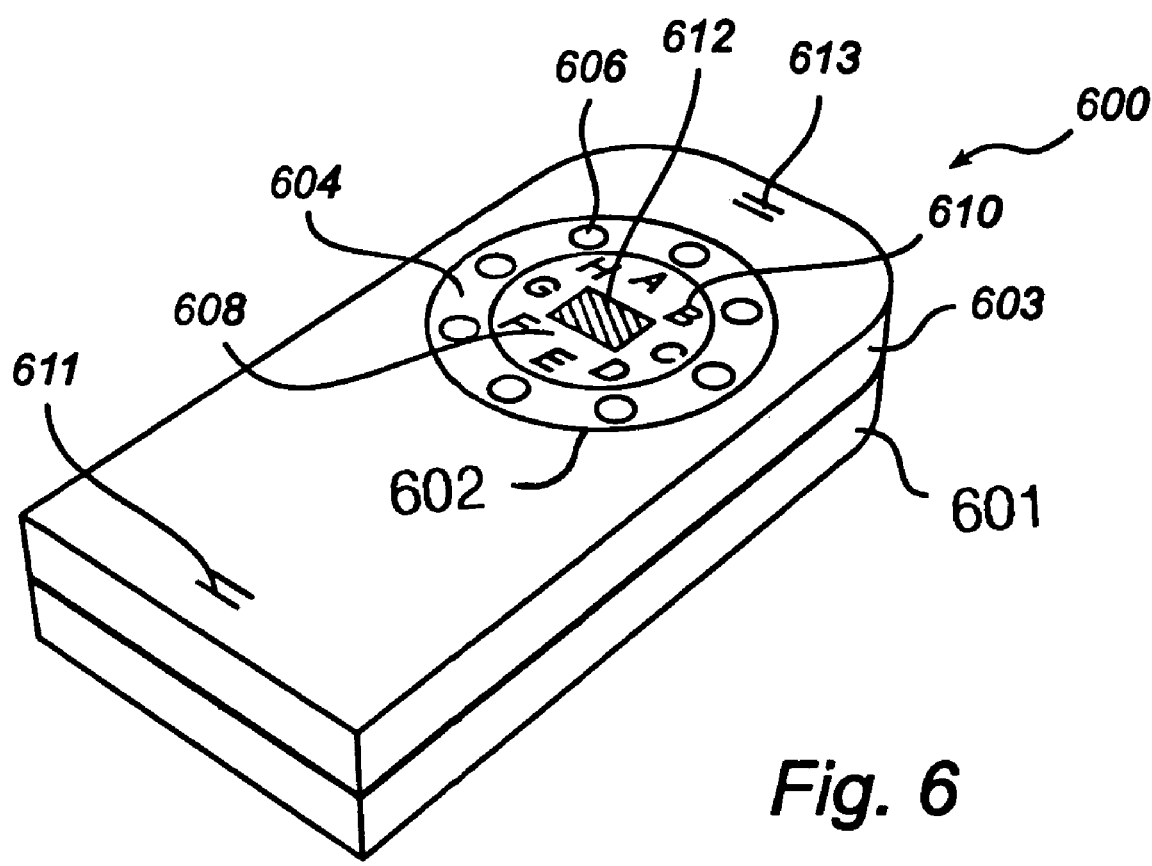
FIG. 6 is a schematically drawn perspective view of a terminal having a cover according to the present invention.

FIG. 6 is a perspective view of a terminal 600 having a main body part 601, a cover 603 and a display 608 with a central area 612. A loudspeaker 613 and a microphone 611 are indicated. The cover 603 comprises a keypad 602 having plural keys 606 on a circular rotatable frame 604. The frame 604 surrounding the display 608 is rotatable in a clockwise and an anti-clockwise direction. Mechanical and electrical means (not shown) are arranged in the terminal 600 to detect rotation of the frame 604 and to provide signals to control circuitry (not shown) in the terminal indicating the amount of rotation. The display 608 is configured to present symbols 610 at positions on the display corresponding to the positions of the keys on the frame 604.

The invention claimed is:
1. Mobile communication terminal comprising a display and a keypad having plural keys, said keypad comprising a frame surrounding the display, where
said keys are arranged at respective key positions on the frame, said terminal is configured to display symbols at positions on the display corresponding to the key positions on the frame, and wherein said frame is arranged to be rotated between at least a first and a second position whereby each said key is rotated with the frame between the at least first and second position and becomes associated with a respective first and second operation of the terminal;

wherein rotation of the frame allows a user to navigate through at least one menu presented on the display of the terminal and the keys being configured so that a function of the keys changes to correspond with an action of a selected menu item.

2. A communication terminal according to claim 1, where the terminal is configured such that symbols of said display changes upon rotation of the frame between said first and second positions.

3. A communication terminal according to claim 1, wherein said frame is round in shape.

4. A communication terminal according to claim 3, wherein said frame is circular.

5. A communication terminal according to claim 1, wherein said frame has any polygonal shape.

6. A communication terminal according to claim 1, wherein rotational motion of the frame is limited by mechanical spring means wherein said second position corresponds to an intermediate position to which said frame is rotated, and from which said frame returns to the first position by the mechanical spring means.

7. Cover for a mobile communication terminal comprising a keypad, said keypad comprising a frame with keys, said frame configured to surround a display on the terminal, wherein said keys are arranged at respective key positions on the frame and said frame is arranged to be rotated between at least a first and a second position whereby each said key is rotated with the frame between the at least first and second position and becomes associated with a respective first and second operation of the terminal wherein rotation of the frame allows a user to navigate through at least one menu presented on the display of the terminal and the keys being configured so that a function of the keys changes to correspond with an action of a selected menu item.

8. A cover for a mobile communication terminal according to claim 7, wherein said frame is round in shape.

9. A cover for a mobile communication terminal according to claim 7, wherein said frame is circular.

10. A cover for a mobile communication terminal according to claim 7, wherein said frame has any polygonal shape.

11. A cover for a mobile communication terminal according to claim 7, wherein rotational motion of the frame is limited by mechanical spring means wherein said second position corresponds to an intermediate position to which said frame is rotated, and from which said frame returns to the first position by the mechanical spring means.

12. A method comprising:

displaying symbols at respective key positions on a display which correspond to key positions on a frame surrounding the display, and wherein rotating the frame between at least a first and a second position whereby each said key is rotated with the frame between the at least first and second position and becomes associated with a respective first and second operation of the terminal;

navigating through at least one menu presented on the display of the terminal and changing a function of the keys to correspond with an action of a selected menu item.

13. A method according to claim 12, wherein the symbols of the display change upon rotation of the frame between said first and second positions.

14. A method according to claim 12, further comprising limiting rotational motion of the frame by mechanical spring means wherein said second position corresponds to an intermediate position to which said frame is rotated, and from which said frame returns to the first position by the mechanical spring means.

* * * * *